United States Patent [19]
Hollenbeck

[11] Patent Number: 5,616,995
[45] Date of Patent: Apr. 1, 1997

[54] SYSTEMS AND METHODS FOR CONTROLLING A DRAFT INDUCER FOR A FURNACE

[75] Inventor: Robert K. Hollenbeck, Fort Wayne, Ind.

[73] Assignee: General Electric Company, Fort Wayne, Ind.

[21] Appl. No.: 402,998

[22] Filed: Mar. 9, 1995

Related U.S. Application Data

[63] Continuation-in-part of Ser. No. 25,371, Feb. 26, 1993, Pat. No. 5,418,438, Ser. No. 299,528, Sep. 1, 1994, Pat. No. 5,557,182, Ser. No. 352,393, Dec. 8, 1994, and Ser. No. 397,686, Mar. 1, 1995, abandoned, which is a continuation-in-part of Ser. No. 25,371, Ser. No. 299,528, and Ser. No. 352,393, said Ser. No. 299,528, is a continuation-in-part of Ser. No. 25,371, said Ser. No. 352,393, is a continuation of Ser. No. 23,790, Feb. 22, 1993, abandoned.

[51] Int. Cl.$^6$ ................ F23L 17/00; H02P 7/00
[52] U.S. Cl. .................. 318/432; 110/162; 236/10; 236/67; 236/DIG. 9
[58] Field of Search .................. 318/268, 276, 318/277, 279, 430, 431, 432, 433; 110/195, 147, 162; 165/16, 31, 32, DIG. 228; 236/10, 16, 49.1, 49.3, 67, DIG. 9

[56] References Cited

U.S. PATENT DOCUMENTS

| | | | |
|---|---|---|---|
| 2,679,607 | 5/1954 | Potter | 310/218 |
| 3,426,273 | 2/1969 | Kuntz et al. | 324/68 |
| 3,517,308 | 6/1970 | Mirdadian | 324/68 |
| 3,550,426 | 12/1970 | Griffo | 73/3 |
| 3,678,352 | 7/1972 | Bedford | 318/254 X |
| 3,679,953 | 7/1972 | Bedford | 318/254 X |
| 3,740,629 | 6/1973 | Kohlhagen | 318/138 |
| 3,765,234 | 10/1973 | Sievert | 73/136 R |
| 3,818,298 | 6/1974 | Eriksson | 318/227 |
| 3,818,310 | 6/1974 | Smith | 321/18 |
| 3,824,446 | 7/1974 | Forster et al. | 318/138 X |

(List continued on next page.)

FOREIGN PATENT DOCUMENTS

| | | |
|---|---|---|
| 0073717 | 8/1982 | European Pat. Off. . |
| 0279771 | 2/1988 | European Pat. Off. . |
| 0433965A1 | 12/1990 | European Pat. Off. . |
| 2547075 | 6/1983 | France . |
| 2662751 | 5/1991 | France . |
| 3314300A1 | 10/1984 | Germany . |
| U-8714498 | 12/1987 | Germany . |
| 1064583 | 9/1987 | Japan . |
| 1268482 | 4/1988 | Japan . |
| 2056044 | 7/1980 | United Kingdom . |

OTHER PUBLICATIONS

R. Itoh et al., "Single-Phase Sinusoidal Rectifier With Step-up/down Characteristics," Nov. 1991, IEEE Proceedings-B, vol. 138, No. 6.

*Primary Examiner*—Bentsu Ro
*Attorney, Agent, or Firm*—Ralph E. Krisher, Jr.

[57] ABSTRACT

Systems and methods for controlling a draft inducer for use with a furnace. The draft inducer includes a fan for moving combustion chamber gases for inducing a draft in the furnace combustion chamber that causes a pressure drop across a heat exchanger. The density of the gases flowing across the heat exchanger and the fan differs from a first operating state of the furnace to a second operating state of the furnace. A motor drives the fan in response to a motor control signal so that different motor speeds result as a function of the density of the gases flowing across the fan. A control circuit generates the motor control signal as a function of a first set of speed/torque curves until a speed signal indicates that the motor has reached a predetermined speed. After the speed signal indicates that the motor has reached the predetermined speed, the control circuit generates the motor control signal as a function of a second set of speed/torque curves. Thus, the motor will operate in accordance with the first speed/torque curves when the furnace is in the first operating state and in accordance with the second speed/torque curves when the furnace is in the second operating state.

54 Claims, 6 Drawing Sheets

U.S. PATENT DOCUMENTS

| | | | |
|---|---|---|---|
| 3,849,718 | 11/1974 | Forster et al. | 318/138 X |
| 3,859,549 | 1/1975 | Boesel | 310/218 |
| 3,859,577 | 1/1975 | Wiart | 318/138 |
| 3,866,099 | 2/1975 | Bourbeau | 318/138 |
| 3,879,646 | 4/1975 | Wiart | 318/138 X |
| 3,940,680 | 2/1976 | Tadokoro et al. | 318/254 X |
| 3,955,130 | 5/1976 | Graf . | |
| 4,005,347 | 1/1977 | Erdman | 318/254 |
| 4,009,825 | 3/1977 | Coon | 165/22 |
| 4,012,677 | 3/1977 | Rist et al. | 318/434 |
| 4,030,005 | 6/1977 | Doemen | 318/138 |
| 4,044,287 | 8/1977 | Ratzel et al. | 318/432 |
| 4,097,789 | 6/1978 | Doeman | 318/461 |
| 4,099,111 | 7/1978 | Inaba et al. | 318/338 |
| 4,119,892 | 10/1978 | Saito et al. | 318/138 |
| 4,167,691 | 9/1979 | Sorensen et al. | 318/138 |
| 4,169,990 | 10/1979 | Lerdman | 318/138 |
| 4,253,053 | 2/1981 | Ray et al. | 318/254 X |
| 4,274,036 | 6/1981 | Fukasaku et al. | 318/331 |
| 4,360,770 | 11/1982 | Ray et al. | 318/254 X |
| 4,371,823 | 2/1983 | Lohest | 318/434 |
| 4,374,347 | 2/1983 | Muller | 318/138 |
| 4,376,261 | 3/1983 | vonder Heide et al. | 318/254 |
| 4,379,984 | 4/1983 | Mueller | 318/254 |
| 4,384,241 | 5/1983 | Stillhard | 318/138 |
| 4,389,886 | 6/1983 | Korczak | 73/168 |
| 4,390,826 | 6/1983 | Erdman et al. | 318/439 |
| 4,392,417 | 7/1983 | Johannsen | 98/1.5 |
| 4,401,933 | 8/1983 | Davy et al. | 318/778 |
| 4,449,079 | 5/1984 | Erdman | 318/138 |
| 4,467,657 | 8/1984 | Olsson | 73/861 |
| 4,499,407 | 2/1985 | Macleod | 318/254 |
| 4,500,821 | 2/1985 | Bitting et al. | 318/254 |
| 4,504,881 | 3/1985 | Wada et al. | 361/23 |
| 4,519,540 | 5/1985 | Boulle et al. | 237/7 |
| 4,520,296 | 5/1985 | Lepper et al. | 318/254 |
| 4,533,986 | 8/1985 | Jones | 363/17 |
| 4,535,275 | 8/1985 | Muller | 318/254 |
| 4,540,921 | 9/1985 | Boyd, Jr. et al. | 318/254 |
| 4,544,868 | 10/1985 | Murty | 318/254 |
| 4,556,827 | 12/1985 | Erdman | 318/254 |
| 4,558,264 | 12/1985 | Weischedel | 318/254 |
| 4,563,619 | 1/1986 | Davis et al. | 318/138 |
| 4,578,623 | 3/1986 | Tsukutani et al. | 318/254 |
| 4,638,233 | 1/1987 | Erdman | 318/644 |
| 4,644,233 | 2/1987 | Suzuki | 318/254 |
| 4,645,450 | 2/1987 | West | 431/12 |
| 4,648,551 | 3/1987 | Thompson et al. | 236/49 |
| 4,651,079 | 3/1987 | Wills | 318/811 |
| 4,654,566 | 3/1987 | Erdman | 318/254 |
| 4,667,480 | 5/1987 | Bessler | 62/180 |
| 4,678,974 | 7/1987 | Guastadini | 318/254 |
| 4,703,747 | 11/1987 | Thompson et al. | 126/112 |
| 4,704,567 | 11/1987 | Suzuki et al. | 318/254 |
| 4,707,646 | 11/1987 | Thompson et al. | 388/816 |
| 4,707,650 | 11/1987 | Bose | 318/254 |
| 4,710,684 | 12/1987 | Okita et al. | 318/254 |
| 4,729,207 | 3/1988 | Dempsey et al. | 126/112 |
| 4,733,146 | 3/1988 | Hamby | 318/393 |
| 4,734,627 | 3/1988 | Koerner | 318/254 |
| 4,737,674 | 4/1988 | Miyao | 310/268 |
| 4,743,815 | 5/1988 | Gee et al. | 318/254 |
| 4,748,388 | 5/1988 | Muller | 318/254 |
| 4,755,728 | 7/1988 | Ban | 318/254 |
| 4,757,241 | 7/1988 | Young | 318/254 |
| 4,774,656 | 9/1988 | Quatse et al. | 364/900 |
| 4,806,833 | 2/1989 | Young | 318/335 |
| 4,818,924 | 4/1989 | Burney | 318/561 |
| 4,820,317 | 4/1989 | Fahey | 55/21 |
| 4,835,448 | 5/1989 | Dishner et al. | 318/254 |
| 4,836,096 | 6/1989 | Avery | 98/34.5 |
| 4,851,751 | 7/1989 | Gipson | 318/599 |
| 4,858,676 | 8/1989 | Bolfik et al. | 165/2 |
| 4,860,231 | 8/1989 | Ballard et al. | 364/571.01 |
| 4,870,332 | 9/1989 | Coghran et al. | 318/254 |
| 4,891,537 | 1/1990 | Shiraki et al. | 318/138 X |
| 4,935,861 | 6/1990 | Johnson, Jr. et al. | 363/132 |
| 4,937,467 | 6/1990 | Tuska et al. | 307/264 |
| 4,940,912 | 7/1990 | Kant et al. | 318/138 X |
| 4,972,134 | 11/1990 | Getz et al. | 318/817 |
| 4,978,896 | 12/1990 | Shah | 318/254 |
| 5,005,115 | 4/1991 | Schauder | 363/159 |
| 5,019,757 | 5/1991 | Beifus | 318/254 |
| 5,057,733 | 10/1991 | Sonoda et al. | 310/269 |
| 5,075,608 | 12/1991 | Erdman et al. | 318/599 |
| 5,075,610 | 12/1991 | Harris | 318/701 |
| 5,086,265 | 2/1992 | Uhlendorf | 318/817 |
| 5,097,168 | 3/1992 | Takekoshi et al. | 310/254 |
| 5,144,543 | 9/1992 | Striek et al. | 363/16 |
| 5,268,623 | 12/1993 | Muller | 318/254 |
| 5,331,944 | 7/1994 | Kujawa et al. | 126/110 R |
| 5,373,205 | 12/1994 | Busick et al. | 318/434 |
| 5,410,230 | 4/1995 | Bessler et al. | 318/471 |
| 5,418,438 | 5/1995 | Hollenbeck | 318/432 |
| 5,492,273 | 2/1996 | Shah | 236/44 A |

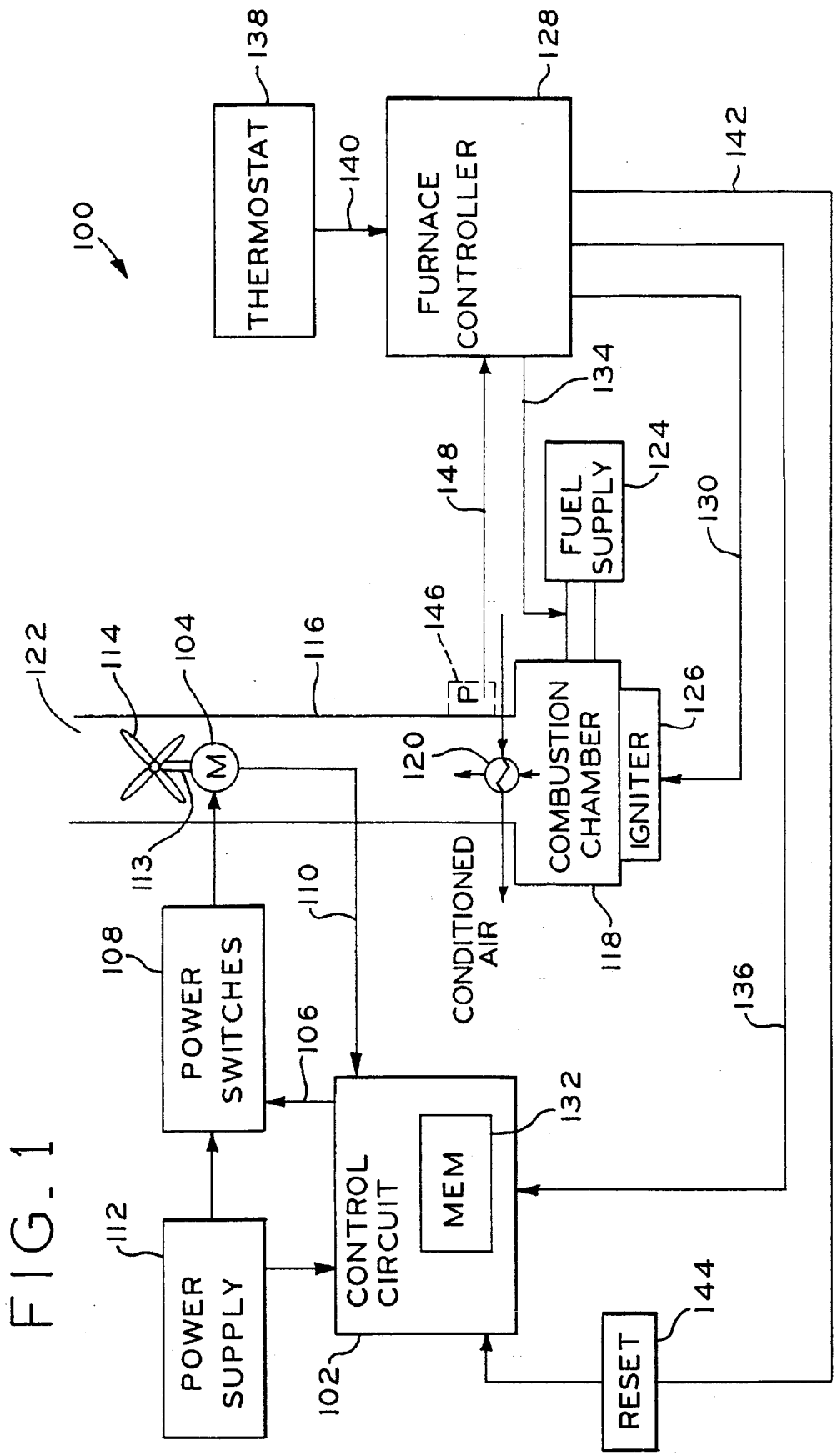
FIG_1

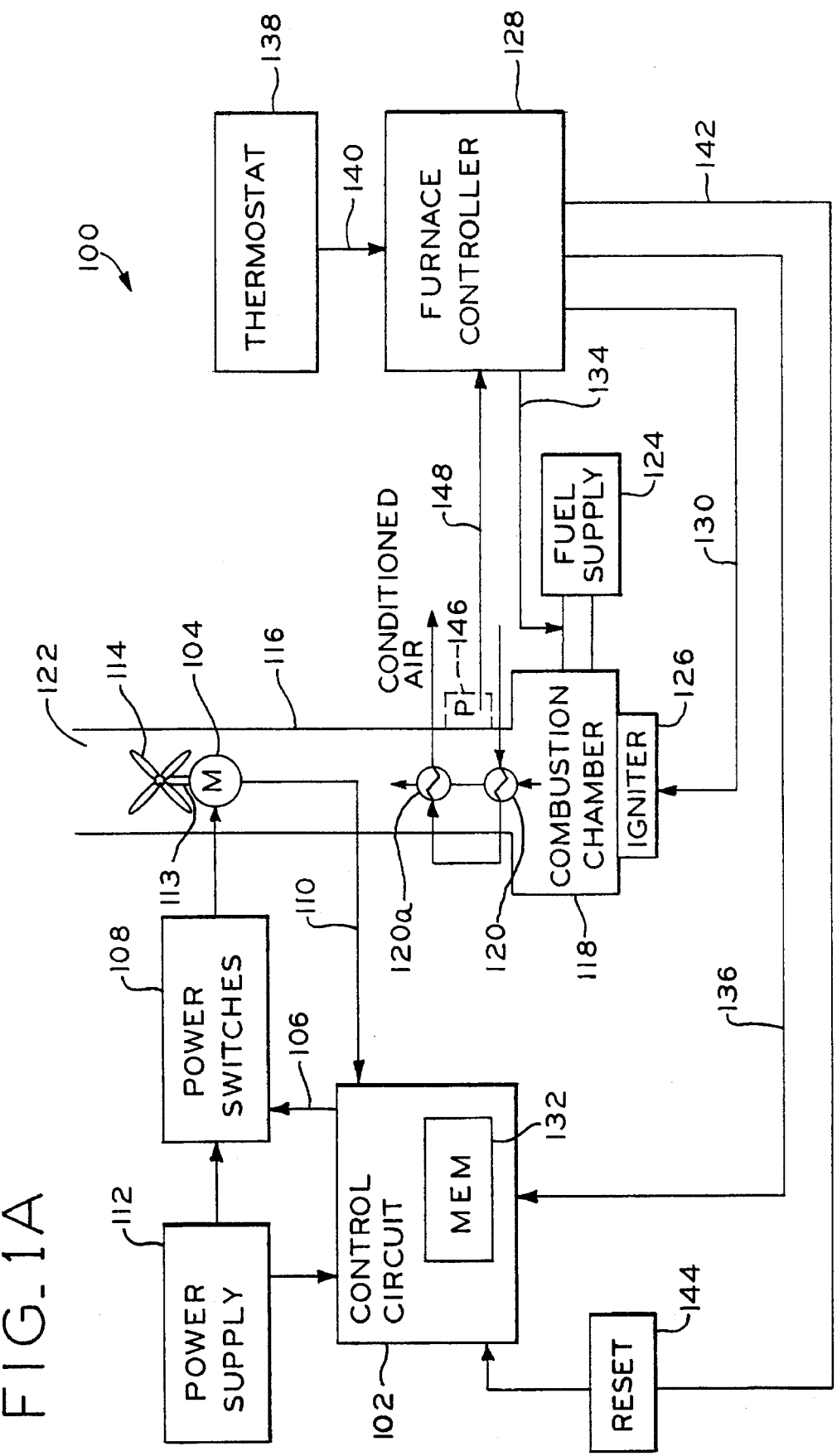
FIG_1A

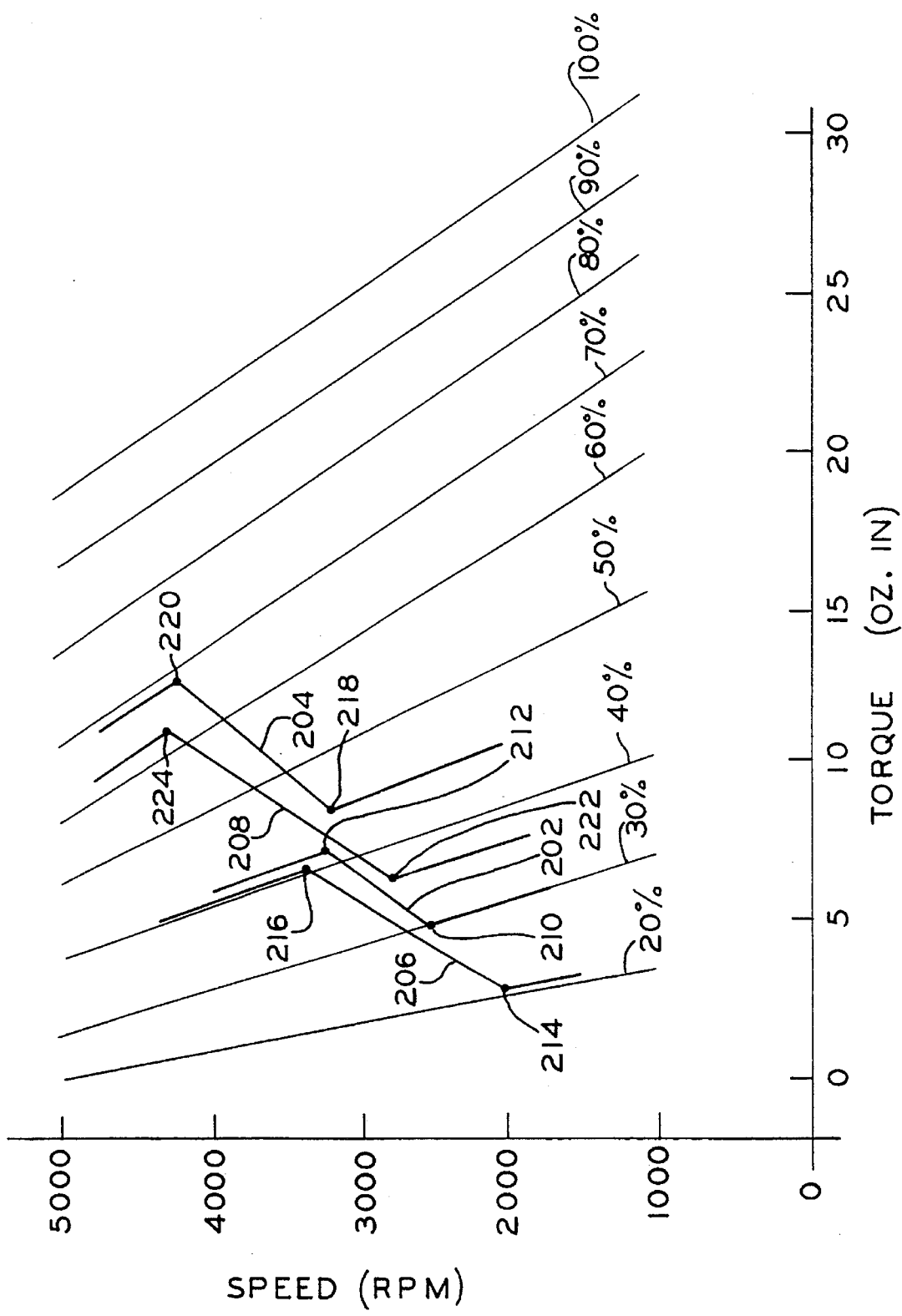
FIG_2

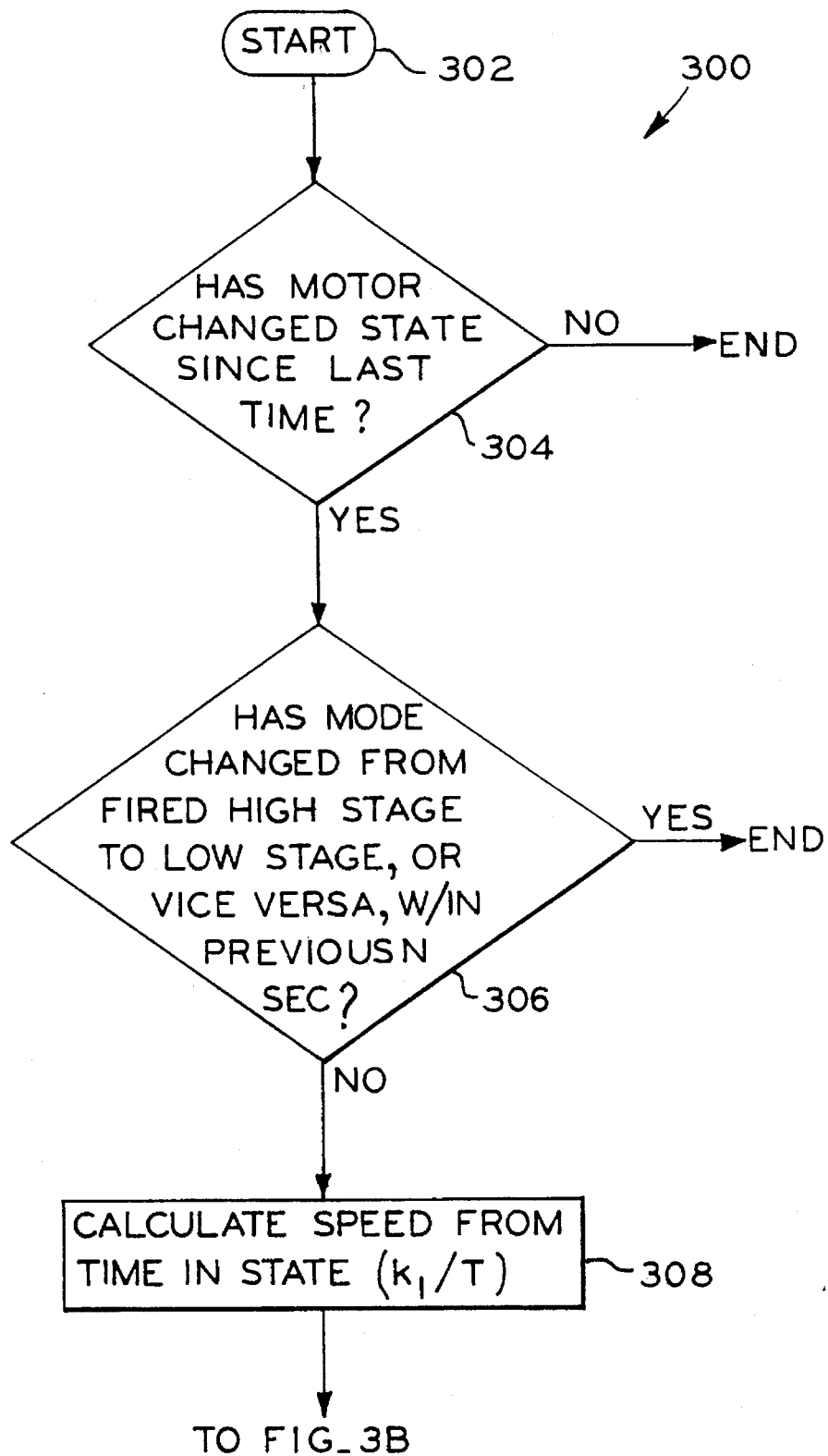

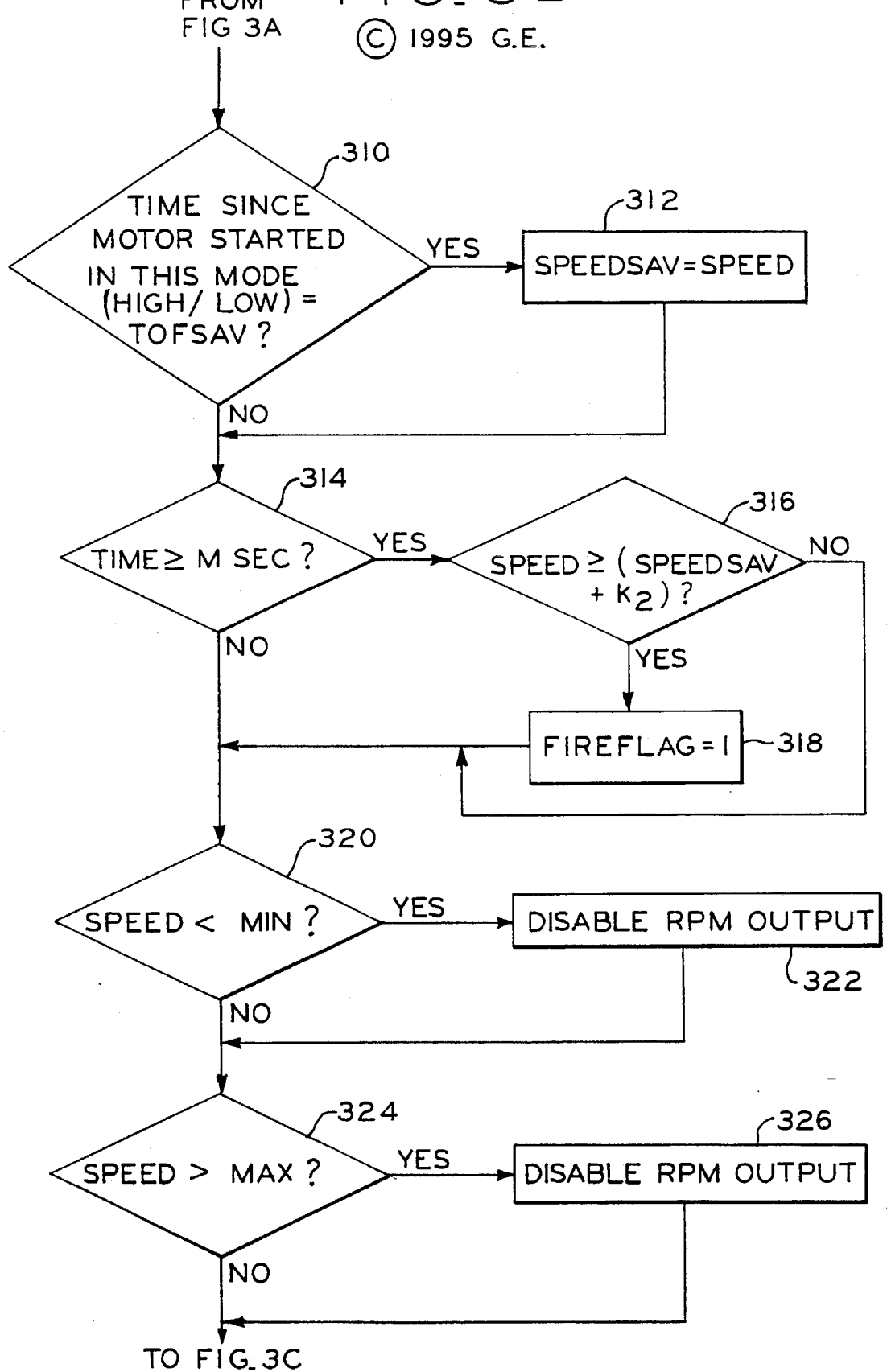

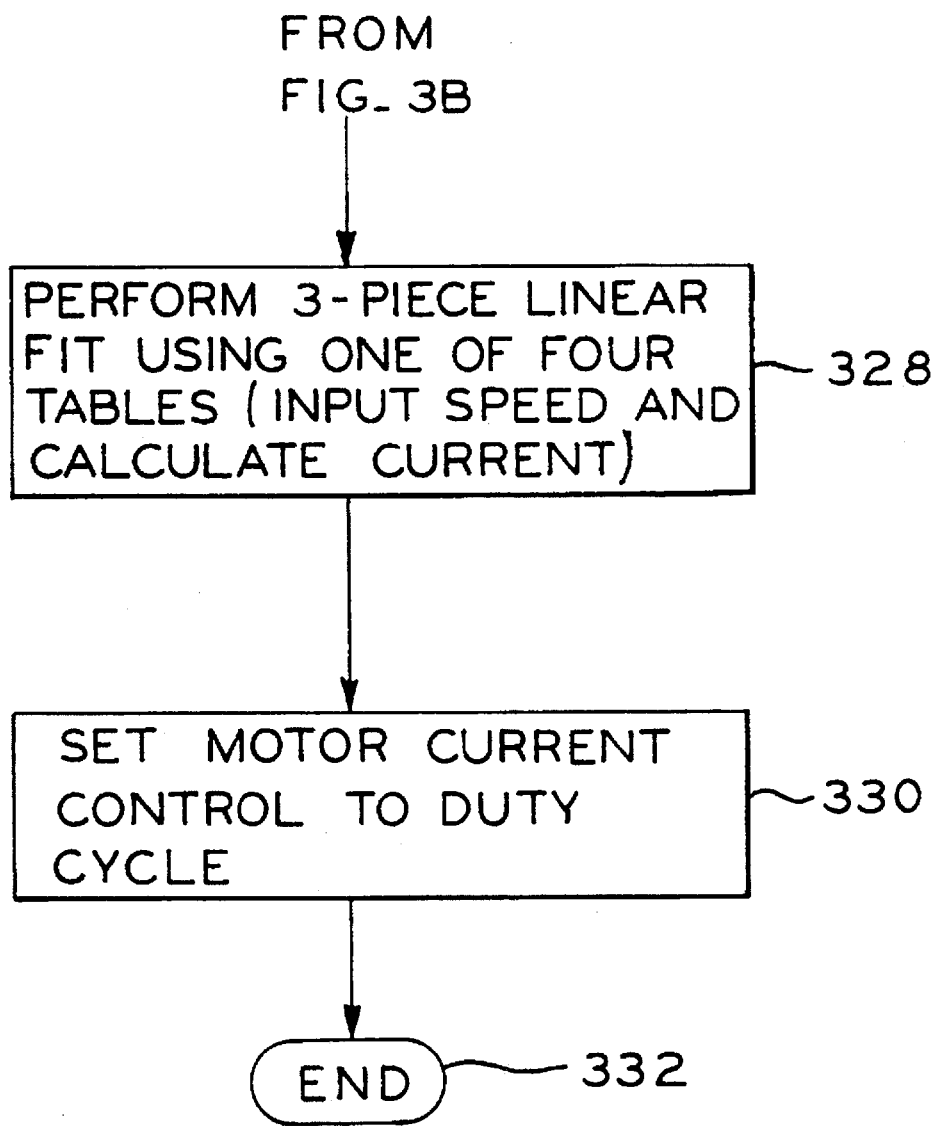

SYSTEMS AND METHODS FOR CONTROLLING A DRAFT INDUCER FOR A FURNACE

CROSS-REFERENCE TO RELATED APPLICATION

This application is a continuation-in-part of 1) commonly assigned application Ser. No. 08/025,371 filed Feb. 26, 1993 (now U.S. Pat. No. 5,418,438); 2) commonly assigned application Ser. No. 08/299,528 filed Sep. 1, 1994 (now U.S. Pat. No. 5,557,182) which application Ser. No. 08/299,528 is a continuation-in-part of application Ser. No. 08/025,371; 3) commonly assigned application Ser. No. 08/352,393 filed Dec. 8, 1994 which application Ser. No. 08/352,393 is a continuation of commonly assigned application Ser. No. 08/023,790 filed Feb. 22, 1993 (abandoned); and 4) commonly assigned application Ser. No. 08/397,686 filed Mar. 1, 1995 (abandoned) which application Ser. No. 08/397,686 is a continuation-in-part of application Ser. No. 08/025,371, application Ser. No. 08/299,528, and application Ser. No. 08/352,393; the entire disclosures of which are incorporated herein by reference.

BACKGROUND OF THE INVENTION

The invention generally relates to electronically controlled motors and, in particular, to a draft inducer system providing improved speed/torque control for a motor driving a fan for inducing a draft in an exhaust.

In a conventional furnace, natural convection currents move air through the exhaust outlet of the furnace's combustion chamber to carry away exhaust gases. The moving air further induces a draft in the combustion chamber for mixing oxygen with the fuel being burned in the chamber. Heat energy remaining in the exhaust gases, however, is lost to the atmosphere which decreases the overall efficiency of the furnace. The use of heat exchangers improves furnace efficiency by extracting additional heat from the exhaust gases before they are vented to the atmosphere. Extracting heat from the exhaust gases, however, reduces the natural convection currents which would otherwise carry the gases away. One solution has been to use a draft inducing fan to force the exhaust gases into the atmosphere.

A prior draft inducer control system for controlling the exhaust of a furnace includes a pressure transducer located in the vent adjacent the combustion chamber, a speed sensor for the motor and a torque sensor for the motor. These components vary the induced draft as a function of the pressure sensed in the exhaust outlet of the combustion chamber. Such a control system is disclosed in commonly assigned U.S. Pat. No. 5,075,608, the entire disclosure of which is incorporated herein by reference.

Application Ser. No. 08/025,371, the entire disclosure of which is incorporated herein by reference, provides improvements in draft inducer systems which beneficially increase furnace efficiency. Such improvements allow preselection of the motor's speed/torque and preselection of the magnitude of the induced draft to match the draft to the particular requirements and operating conditions of the furnace. Other improvements allow this preselection to be made quickly and economically during manufacture or installation of the furnace and provide greater versatility of the draft inducer control system in responding to various control signal conditions.

Further improvements provided by application Ser. No. 08/299,528, the entire disclosure of which is incorporated herein by reference, minimize the risk of overheating the electronic control of a draft inducer system by maintaining motor operation within a safe area. For example, a motor driving a draft inducer is generally able to provide relatively high torque at variable speeds. However, operation of the motor at relatively low speeds results in increased operating temperatures when torque is excessive or when the motor is otherwise operating under abnormal conditions. If the motor exceeds allowable operating temperatures, its electronic control can fail. Present motor systems provide various controls affecting motor speed, current and torque but often fail to provide adequate protection against the generation of excessive heat. The system of application Ser. No. 08/299,528 maintains motor operation within a safe area with respect to motor speed/torque and provides a maximum current limit as a function of motor speed thereby to maintain safe operating temperatures.

While such systems represent improvements, further improvements in draft inducer control systems, draft inducer apparatus, and methods of control and operation are needed to beneficially provide motor control for maintaining pressure across the heat exchanger at a desired level without the use of a pressure transducer for controlling motor speed. Improvements in sensing ignition in the combustion chamber are also needed since combustion decreases the density of the combustion chamber gases moved by the draft inducer fan which can affect motor speed/torque.

SUMMARY OF THE INVENTION

Among the objects of the invention are to provide an improved motor system and method of control which overcome at least some of the disadvantageous conditions described above; to provide such a motor system and method which permit sensing ignition in the combustion chamber of a furnace; to provide such a motor system and method which permit controlling motor operation as a function of the density of combustion chamber gases in the combustion chamber; to provide such a motor system and method which permit maintaining a desired pressure across a heat exchanger for extracting heat from the combustion chamber's exhaust; to provide such a motor system and method which permit maintaining a desired air/combustion material mixture; and to provide such a motor system and method which are electrically efficient, reliable, economical and convenient to use.

Briefly described, a draft inducer apparatus embodying aspects of the present invention is for use with a furnace that has a combustion chamber providing combustion gases and an exhaust outlet for venting exhaust combustion gases from the furnace. The furnace also has at least one heat exchanger for extracting heat from exhaust combustion chamber gases and transferring heat to conditioned air. The apparatus is also for use with a fan for moving the combustion chamber gases through the exhaust outlet for inducing a draft in the combustion chamber that causes a pressure drop across the heat exchanger. The furnace is operable in at least two operating states wherein the density of the combustion chamber gases flowing across the heat exchanger and the fan differs from a first operating state to a second operating state. The apparatus includes a motor with a shaft for driving the fan in response to a motor control signal so that different motor speeds result as a function of the density of the combustion chamber gases flowing across the fan. According to the invention, a speed circuit provides a speed signal representative of the motor speed and a circuit defines first and second sets of speed/torque curves corresponding to a desired pressure across the heat exchanger. The apparatus further includes a control circuit responsive to the speed signal for generating the motor control signal as a function of the first set of speed/torque curves until the speed signal indicates that the motor speed has reached a predetermined speed. After the speed signal indicates that the motor speed has reached the predetermined speed, the control circuit generates the motor control signal as a function of the second set of speed/torque curves. Thus, the motor will operate in accordance with one or more of the first speed/torque curves when the furnace is in the first operating state and in accordance with one or more of the second speed/torque curves when the furnace is in the second operating state.

In another form, a furnace system embodying aspects of the present invention is operable in at least two states and includes a combustion chamber providing combustion gases and an exhaust outlet for venting exhaust combustion gases from the furnace system. The furnace system also includes at least one heat exchanger for extracting heat from exhaust combustion chamber gases and transferring heat to conditioned air. According to the invention, the furnace system has a fan for moving the combustion chamber gases through the exhaust outlet for inducing a draft in the combustion chamber that causes a pressure drop across the heat exchanger wherein the density of the combustion chamber gases flowing across the heat exchanger and the fan differs from a first operating state to a second operating state. The furnace system further includes a motor with a shaft for driving the fan in response to a motor control signal so that different motor speeds result as a function of the density of the combustion chamber gases flowing across the fan. According to the invention, a speed circuit provides a speed signal representative of the motor speed and a circuit defines first and second sets of speed/torque curves corresponding to a desired pressure across the heat exchanger. The furnace system further includes a control circuit responsive to the speed signal for generating the motor control signal as a function of the first set of speed/torque curves until the speed signal indicates that the motor speed has reached a predetermined speed. After the speed signal indicates that the motor speed has reached the predetermined speed, the control circuit generates the motor control signal as a function of the second set of speed/torque curves. Thus, the motor will operate in accordance with one or more of the first speed/torque curves when the furnace system is in the first operating state and in accordance with one or more of the second speed/torque curves when the furnace system is in the second operating state.

Generally, another form of the invention is a method of operating a draft inducer apparatus for use with a furnace that has a combustion chamber producing combustion gases and an exhaust outlet for venting exhaust combustion gases from the furnace. The furnace also has at least one heat exchanger for extracting heat from exhaust combustion chamber gases and transferring heat to conditioned air. The draft inducer apparatus is also for use with a fan for moving the combustion chamber gases through the exhaust outlet for inducing a draft in the combustion chamber that causes a pressure drop across the heat exchanger. The furnace is operable in at least two operating states wherein the density of the combustion chamber gases flowing across the heat exchanger and the fan differs from a first operating state to a second operating state. The method includes the step of driving the fan with a motor in response to a motor control signal so that different motor speeds result as a function of the density of the combustion chamber gases flowing across the fan. The method also includes the steps of providing a speed signal representative of the motor speed and defining first and second sets of speed/torque curves corresponding to a desired pressure across the heat exchanger. The method further includes the step of generating the motor control signal in response to the speed signal as a function of the first set of speed/torque curves until the speed signal indicates that the motor speed has reached a predetermined speed and the step of generating the motor control signal in response to the speed signal as a function of the second set of speed/torque curves after the speed signal indicates that the motor speed has reached the predetermined speed. In this manner, the motor will operate in accordance with one or more of the first speed/torque curves when the furnace is in the first operating state and in accordance with one or more of the second speed/torque curves when the furnace is in the second operating state.

Other objects and features will be in part apparent and in part pointed out hereinafter.

BRIEF DESCRIPTION OF THE DRAWINGS

FIG. 1 is a block diagram of a furnace system including a control circuit for a motor according to one preferred embodiment of the invention.

FIG. 1A is a block diagram of a furnace system including a control circuit for a motor according to another preferred embodiment of the invention.

FIG. 2 illustrates exemplary speed vs. torque curves defining four operating states of the system of FIG. 1.

FIGS. 3A, 3B and 3C illustrate a flow diagram of the operation of the control circuit of FIG. 1.

Corresponding reference characters indicate corresponding parts throughout the drawings.

DETAILED DESCRIPTION OF THE PREFERRED EMBODIMENTS

Referring now to FIG. 1, one preferred embodiment of a system 100 is shown, including a control circuit 102 for any electronically controllable motor. Such motors include single and variable speed motors, selectable speed motors having a plurality of finite, discrete speeds and brushless DC motors, including electronically commutated motors and switched reluctance motors. In the illustrated embodiment, the control circuit 102 is connected to a motor 104. The motor 104 is preferably a draft inducer variable speed motor such as the single phase motor described in application Ser. No. 08/352,393, the entire disclosure of which is incorporated herein by reference. Control circuit 102 is preferably mounted within a housing (not shown) of motor 104 and sends control commands to motor 104 via line 106 to a set of power switches 108. Control circuit 102 also receives speed or torque feedback from motor 104 via line 110. In a preferred embodiment, motor 104 has a stationary assembly (not shown) and a rotatable assembly (not shown) in magnetic coupling relation to the stationary assembly. The stationary assembly includes windings adapted to be energized in at least one preselected sequence. The power switches 108, responsive to the control commands at line 106, selectively connect a power supply 112 to the windings of motor 104 to provide current to the windings in the preselected sequence to produce an electromagnetic field for rotating the rotatable assembly. The rotatable assembly of motor 104 is coupled via a shaft 113 to a rotatable component, such as a fan 114, for inducing a draft in an exhaust outlet 116 of a conventional heating, ventilating, and air conditioning system.

According to the invention, the system 100 is for use with a furnace (portions of which are shown in FIG. 1). In the alternative, system 100 includes the furnace. The furnace includes a combustion chamber 118 providing combustion gases to which the exhaust outlet 116 is connected for venting exhaust combustion gases from the furnace. Fan 114, which is positioned within exhaust outlet 116 in one embodiment, induces a draft in the combustion chamber 118 by moving exhaust combustion chamber gases through exhaust outlet 116. As a result of the moving gases, a pressure is established in exhaust outlet 116. In an alternative embodiment, fan 114 is positioned in an inlet (not shown) to combustion chamber 118.

The furnace conditions air for heating a space (not shown) by moving air with a blower (not shown) across a heat exchanger 120 positioned adjacent combustion chamber 118. In this manner, the conditioned air gains heat before it is discharged to the space by the blower. As described above, natural convection forces cause hot exhaust gases to rise and vent to the atmosphere in a typical furnace. In a preferred embodiment, the heat exchanger 120 also extracts heat from the exhaust combustion chamber gases before they are vented away. Additional pressure, however, is then needed to force the cooled exhaust through exhaust outlet 116 and to the atmosphere via an exhaust port 122. Inducing a draft with fan 114 provides the additional pressure. In this manner, fan 114 develops a positive flue pressure which forces the furnace exhaust from combustion chamber 118 through heat exchanger 120 (where heat is extracted and transferred to conditioned air provided to the space to be heated) and then forces cooled exhaust to vent via the exhaust port 122 of exhaust outlet 116. As described herein, exhaust combustion chamber gases include products of combustion, fuel gases and/or input air. Thus, when combustion chamber 118 is not ignited, the exhaust combustion chamber gases primarily constitute air being moved through combustion chamber 118 by fan 114.

In another preferred embodiment, shown in FIG. 1A, system 100 includes an additional heat exchanger 120a for extracting heat from the exhaust combustion chamber gases. It is to be understood that the positional relationships between exhaust outlet 116, combustion chamber 118, heat exchanger 120 and/or heat exchanger 120a may vary depending on the particular furnace. Further, the number of heat exchangers or the number of heat exchanger elements used in the particular furnace may vary as well. In a preferred embodiment, a furnace according to the present invention is of a general type, such as a two-stage condensing furnace. However, a furnace according to the invention could be a single or multiple stage, or variable stage, condensing or non-condensing furnace. For clarity, the present invention will be described with respect to heat exchanger 120 of FIG. 1 where corresponding reference characters throughout FIGS. 1 and 1A indicate corresponding parts.

According to the invention, the furnace preferably operates in at least two operating states. In a first, or pre-fire, operating state, combustion does not occur in combustion chamber 118. In a second, or post-fire, operating state, however, a fuel supply 124 provides a combustible material (i.e., a fuel such as natural gas or oil) to combustion chamber 118. An igniter 126, activated by a furnace controller 128 via line 130, ignites the combustible fuel within chamber 118. In the second operating state, combustion occurs in combustion chamber 118. In another preferred embodiment of the invention, the furnace controller 128 is embodied by control circuit 102 which provides control not only for motor 104 but also for the furnace.

As a general rule, the density of the combustion chamber gases flowing through or across heat exchanger 120 and fan 114 is greater in the first operating state, without combustion, than in the second operating state, with combustion. As a result, the speed of fan 114 increases when the furnace changes from the first operating state to the second operating state. Similarly, in a system operating such that speed remains constant, motor torque will decrease as the density of the combustion chamber gases flowing across fan 114 decreases.

The speed of fan 114 as driven by motor 104 regulates the flow of combustion chamber gases in system 100. In systems where combustion by-products need to be controlled, it is important to achieve the proper amount of input air mixed with fuel so that an optimum air-fuel mixture is constantly being burned in combustion chamber 118. To achieve the proper air-fuel mixture, combustion products must be exhausted at an appropriate rate.

As described above, the density of combustion chamber gases flowing across heat exchanger 120 is greater when the furnace is operating in its first operating state rather than in its second operating state. According to the invention, the control commands on line 106 take the form of a motor control signal. Motor 104 drives fan 114 in response to an appropriate motor control signal at a motor speed which is a function of the density of the combustion chamber gases flowing across heat exchanger 120. As such, different motor speeds result as a function of the density of the combustion chamber gases flowing across fan 114. In turn, fan 114 moves the combustion chamber gases through exhaust outlet 116 thereby inducing a draft in combustion chamber 118 that causes a pressure drop across heat exchanger 120.

A speed circuit, preferably resident in control circuit 102, provides a speed signal representative of the speed of motor 104 in response to the speed/torque feedback via line 110. In the alternative, the speed signal could be provided by a speed sensor external to the housing of motor 104. As stated above, U.S. Pat. No. 5,075,608 discloses a control system for regulating the speed of a draft inducer fan as a function of the pressure in the furnace's exhaust outlet. Advantageously, the present invention accomplishes speed regulation to maintain a desired pressure across heat exchanger 120 as a function of predefined speed/torque curves rather than by using a pressure sensor. Thus, the need for a pressure sensor for regulating motor speed is eliminated.

Control circuit 102 generates motor control signals in response to the speed signal as a function of either a first set of speed/torque curves or a second set of speed/torque curves. Prior to operating system 100, the speed/torque curves are developed by running a sample furnace under varying conditions. For example, a motor similar to motor 104 drives a fan similar to fan 114 for moving combustion chamber gases at a given density and at a given fuel flow to the sample furnace's combustion chamber. An operator varies the duty cycle of current energizing the motor's windings until a desired pressure drop across heat exchanger 120 is reached in the sample furnace and then measures motor speed. By varying the restrictions to air flow in the sample furnace, a number of samples can be taken for developing speed/torque curves. For example, a speed/torque curve is developed by performing a 3-piece linear fit of four samples taken at various air restrictions. As a specific example, for a pressure of 1.8 inches, a current value of 90 (where 0 corresponds to 0% duty cycle and 255 corresponds to 100% duty cycle) yields a minimum speed of 2100 at a minimum air restriction; and a current value of 160 yields a maximum speed of 4300 rpm at a maximum acceptable air restriction. Two intermediate points are obtained with a current value of 110 and a speed of 2700 rpm and with a current value of 130 and a speed of 3400 rpm. The duty cycle is a convenient means for generating speed/torque curves during testing of motor 104. Further, by changing the air restrictions, the operator simulates various lengths of piping connected to the furnace. Also, the maximum air restriction is selected as a function of noise, the maximum motor speed and the like. The process is then repeated for low density combustion chamber gases, that is, with combustion in the sample furnace's combustion chamber. Similarly, speed/torque curves are developed for different fuel flows requiring different pressures, that is, low and high stage furnace operation. The operator can further modify the curves by varying the advance angles and off times of the current energizing the motor's windings to achieve desired performance.

In one preferred embodiment, control circuit 102 includes a memory 132 for storing the first and second sets of speed/torque curves as a table of predefined speed/torque values corresponding to desired operation of the furnace under varying conditions, including various restrictions to air flow. Thus, the memory 132 defines the first and second sets of speed/torque curves corresponding to a desired pressure drop across heat exchanger 120.

As described above, control circuit 102 generates motor control signals in response to the speed signal as a function of either the first or second set of speed/torque curves. According to a preferred embodiment of the invention, control circuit 102 generates the motor control signal as a function of the first set of speed/torque curves until the speed signal indicates that the speed of motor 104 has reached a predetermined speed. After the speed signal indicates that the speed of motor 104 has reached the predetermined speed, control circuit 102 generates the motor control signal as a function of the second set of speed/torque curves. In this manner, motor 104 will operate in accordance with one or more of the first speed/torque curves when the furnace is in the first operating state and in accordance with one or more of the second speed/torque curves when the furnace is in the second operating state.

In addition to storing the first and second sets of speed/torque curves, memory 132 preferably stores the speed of motor 104 as represented by the speed signal a predetermined period of time after motor 104 first begins driving fan 114. A circuit resident in control circuit 102 compares the stored speed to the motor speed as subsequently represented by the speed signal. In this manner, control circuit 102 detects a change from the first operating state to the second operating state when the difference between the compared speeds exceeds a predetermined amount. A change in the density of the combustion chamber gases flowing across heat exchanger 120 causes this speed difference. As such, control circuit 102 provides adaptive control.

The furnace system of the invention includes furnace controller 128 which provides a furnace operating signal for causing the furnace to operate in either a low stage or a high stage of the first and second operating states. The low stage corresponds to a low desired flow of fuel to combustion chamber 118 and to a low desired pressure drop across heat exchanger 120. Likewise, the high stage corresponds to a high desired flow of fuel to combustion chamber 118 greater than the low desired flow and to a high desired pressure drop across heat exchanger 120 greater than the low desired pressure drop. As an example, the low delta pressure may be 1.05 inches and the high delta pressure may be 2.2 inches for heat exchanger 120. The furnace controller 128 communicates the desired low or high stage to the fuel supply 124 via line 134 for varying the amount of fuel supplied to combustion chamber 118.

The first and second sets of speed/torque curves each include a speed/torque curve corresponding to the low stage and a speed/torque curve corresponding to the high stage. Thus, in a preferred embodiment of the invention, memory 132 stores a pre-fire low stage speed/torque curve and a pre-fire high stage speed/torque curve in addition to a post-fire low stage speed/torque curve and a post-fire high stage speed/torque curve. Control circuit 102 generates the appropriate motor control signal in response to the furnace operating signal as a function of the pre-fire low stage speed/torque curve in the low stage of the first operating state and as a function of the pre-fire high stage speed/torque curve in the high stage of the first operating state. Likewise, control circuit 102 further generates the motor control signal as a function of the post-fire low stage speed/torque curve in the low stage of the second operating state and as a function of the post-fire high stage speed/torque curve in the high stage of the second operating state.

Furnace controller 128 also communicates the desired low or high stage to control circuit 102 via line 136. When changing in-state from the low stage to the high stage, control circuit 102 generates a motor control signal independent of the speed/torque curves. For example, if the furnace is operating in the low stage of the second operating state, the independent motor control signal adds a current value of 80 to the present low stage current value for a period of time, such as 1.5 seconds. This causes motor 104 to rapidly increase its speed before control circuit 102 generates the motor control signal as a function of the post-fire high stage speed/torque curve. Similarly, when changing in-state from the high stage to the low stage, control circuit 102 also generates a motor control signal independent of the speed/torque curves. For example, if the furnace is operating in the high stage of the second operating state, the independent motor control signal subtracts a current value of 40 from the present high stage current value for a period of time, such as 1.5 seconds. This causes motor 104 to rapidly decrease its speed before control circuit 102 generates the motor control signal as a function of the post-fire low stage speed/torque curve.

According to the invention, the furnace discharges heated conditioned air to the space to be heated in response to a thermostatic control 138. The thermostatic control 138 preferably provides a two state thermostat signal via line 140 to furnace controller 128 as a function of the temperature of the air in the space. Furnace controller 128 begins operation of the furnace in the first operating state in response to a DEMAND state of the thermostat signal. Conversely, furnace controller 128 ends operation of the furnace in the second operating state in response to a NO DEMAND state of the thermostat signal. Furnace controller 128 communicates the state of thermostatic control 138 via line 142. In response to the NO DEMAND state, control circuit 102 generates a motor control signal for causing motor 104 to drive fan 114 for a predetermined period of time, for example 15 seconds, after the furnace ends operation in the second operating state. In this manner, fan 114 clears combustion chamber gases, including unburned fuel and remaining exhaust, from exhaust outlet 116. It is to be understood that the DEMAND state of the thermostat control signal can correspond to the low stage or high stage or an intermediate stage depending on the particular operating parameters of the furnace and the temperature in the space.

In a preferred embodiment, a reset circuit 144, alternatively embodied resident in control circuit 102, is responsive to the NO DEMAND state to reset control circuit 102 after the furnace ends operation in the second operating state.

The furnace further includes a fuel control resident in furnace controller 128 for providing a fuel signal which represents whether fuel supply 124 is supplying fuel to combustion chamber 118. In an alternative embodiment, memory 132 is responsive to the fuel signal via line 136 for storing the speed of motor 104 as represented by the speed signal when the fuel signal indicates that fuel supply 124 is not supplying fuel to combustion chamber 118. Control circuit 102 then compares the stored speed to the motor speed when the fuel signal indicates that fuel is being supplied to combustion chamber 118.

In an alternative embodiment of the invention, system 100 includes a pressure switch 146, shown in phantom in FIG. 1. The pressure switch 146, preferably located within exhaust outlet 116 between fan 114 and combustion chamber 118, functions as a safety backup for system 100. For example, if the pressure in exhaust outlet 116 falls below a particular level, the risk of a backdraft or a buildup of exhaust gases increases. Pressure switch 146 preferably detects when the pressure drop across heat exchanger 120 has fallen below an acceptable minimum pressure. If so, the furnace is instructed via line 148 to shut off the flow of fuel to combustion chamber 118. Thus, pressure switch 146 functions as a safety backup feature by disabling the furnace when the pressure drop across heat exchanger 120 becomes low.

FIG. 2 illustrates exemplary speed vs. torque curves for motor 104 driving draft inducer fan 114. Control circuit 102 preferably controls powers switches 108 in accordance with the motor control signal which represents a desired current signal based on the speed/torque curves. In effect, the desired current signal corresponds to a desired torque signal because the torque of the motor is related to the motor current as shown in FIG. 2. The control commands at line 106 are a function of the desired current signal and cause power switches 108 to selectively energize the windings of motor 104.

In a preferred embodiment, the desired current signal is a mapping of current values corresponding to a duty cycle input to motor 104. The duty cycle is a convenient means for generating speed/torque curves during testing of motor 104. FIG. 2 illustrates the speed/torque curves associated with duty cycles of 20%, 30%, 40%, 50%, 60%, 70%, 80%, 90% and 100%.

In this embodiment of the invention, each curve is representative of the torque produced by motor 104 when its windings are energized by a substantially constant current with respect to speed. As shown by these curves, the windings of motor 104 in this embodiment of the invention have a relatively high inductance and less torque is produced in response to a particular current demand at high speeds than at low speeds. For clarity, the speed/torque curves of FIG. 2 are illustrated as smooth lines. However, the actual speed/torque response illustrated by these curves include variations caused by switching noise and the like. Further, it is to be understood that the curves may vary for applications other than those specifically disclosed herein.

According to the invention, operation of motor 104 is controlled according to one of first speed/torque operating curves 202 and 204 or one of second speed/torque operating curves 206 and 208. As shown, the curve 202 corresponds to pre-fire low stage operation and the curve 204 corresponds to pre-fire high stage operation. Likewise, the curve 206 corresponds to post-fire low stage operation and the curve 208 corresponds to post-fire high stage operation. Generally, each of curves 202, 204, 206 and 208 represent operation resulting in a relatively constant desired pressure drop across heat exchanger 120. However, it is to be understood that for certain applications of the invention, the desired pressure may be, for example, slightly greater at lower motor speeds. Further, each of curves 202, 204, 206 and 208 are merely exemplary and are to be used for a particular furnace.

In operation of system 100, thermostatic control 138 provides the DEMAND signal requesting heating in the space. In response, furnace controller 128 selects either high stage or low stage operation. Control circuit 102 generates the appropriate motor control signals for beginning operation of motor 104 according to either curve 202 or 204 as determined by furnace controller 128. For clarity, low stage operation will be described first.

Control circuit 102 generates the motor control signal to begin operation of motor 104 at the minimum desired speed for pre-fire low stage operation, as shown at point 210 on curve 202. Control circuit 102 operates according to an algorithm embodied in flow diagram form in FIGS. 3A–C. Motor 104 seeks a steady state speed on curve 202 according to the air restriction in the furnace of system 100 between point 210 and the maximum desired speed for pre-fire low stage operation, as shown at point 212 on curve 202. After a predetermined period of time, 21 seconds, for example, the steady state speed of motor 104, as represented by the speed signal, is stored in memory 132 of control circuit 102. After 40 seconds, for example, system 100 continuously monitors motor speed.

Furnace controller 128 then commands fuel supply 124 via line 134 to supply combustion chamber 118 with-fuel according to the low stage desired fuel flow. By operating motor 104 according to curve 202, system 100 maintains the pressure drop across heat exchanger 120 at a desired level and, thus, provides a desired air-fuel mixture in combustion chamber 118. Furnace controller 128 also activates igniter 126 via line 130 so that the air-fuel mixture burns. As the combustion chamber gases flowing across heat exchanger 120 heat up, the density decreases resulting in a relatively sudden increase in the speed of fan 114. By monitoring the speed of motor 104 and comparing the present speed to the speed stored in memory 132, control circuit 102 detects fire in combustion chamber 118 when the present speed exceeds the stored speed by a predetermined amount, e.g., 275 rpm. As a result of the sudden increase in speed, the pressure across heat exchanger 120 also increases momentarily until control circuit 102 switches its operation to post-fire low stage curve 206. Motor 104 then seeks a steady state speed on curve 206 according to the air restriction in the furnace of system 100 between the minimum desired speed for post-fire low stage operation, as shown at point 214 on curve 206, and the maximum desired speed for post-fire low stage operation, as shown at point 216 on curve 206.

As shown in FIG. 2, points 218 and 220 indicate the minimum and maximum, respectively, desired speeds for pre-fire high stage operation of the furnace. Likewise, points 222 and 224 indicate the minimum and maximum, respectively, desired speeds for post-fire high stage operation of the furnace.

FIGS. 3A, 3B and 3C illustrate the operation of system 100 in the form of a flow diagram 300. In a preferred embodiment of the invention, control circuit 102 includes a processor (not shown) for performing the operations illustrated by the flow diagram 300.

After beginning at a step 302, control circuit 102 determines at a step 304 whether motor 104 has changed state since the last time its processor performed the steps of flow diagram 300. In this instance, the term "state" refers to a commutation of the windings of motor 104. For a single phase motor, a "state" corresponds to 180 electrical degrees. If motor 104 has not changed state, then flow diagram 300 ends. If, however, motor 104 has changed state, control circuit 102 proceeds to a step 306. At step 306, control circuit 102 determines whether the furnace mode has changed within a period to time, n. In other words, control circuit 102 determines whether the furnace changed from the low stage to the high stage, or vice versa, of the second operating state during the previous n=1.5 seconds, for example. If the furnace mode has changed, then flow diagram 300 ends. On the other hand, if the furnace mode has not changed, then control circuit 102 calculates the speed of motor 104 at a step 308 as a function of the time it takes for the rotatable assembly of motor 104 to complete a revolution. This is accomplished by dividing a constant $k_1$ by the time motor 104 spent in the commutation state.

Control circuit 102 then proceeds to a step 310 for comparing the time motor 104 has been operating in the particular furnace mode (high stage or low stage) to a predetermined period of time, TOFSAV. The time period TOFSAV is preferably set for a particular furnace controller 128 and corresponds to the time necessary for motor 104 to reach a relatively steady state speed. As an example, TOFSAV=21 seconds. Thus, memory 124 stores the speed of motor 104 as calculated in step 308 and as represented by the speed signal as SPEEDSAV at a step 312 when the time in the the operating state equals TOFSAV. Thereafter, control circuit 102 monitors the speed of motor 102 when the time in the operating state exceeds another predetermined time period, m, at a step 314. As an example, m=40 seconds for a particular furnace which typically ignites after 45 seconds. In this manner, the risk of false indications of operating state changes between 21 and 40 seconds is eliminated.

After the time in the operating state exceeds m, control circuit 102 proceeds to a step 316 for determining whether the present speed of motor 104 exceeds the stored speed by a predetermined amount. Particularly, the speed of motor 104 is compared to (SPEEDSAV+$k_2$). As an example, $k_2$=275 rpm. If motor speed exceeds (SPEEDSAV+$k_2$), then control circuit 102 determines that the density of the combustion chamber gases flowing across heat exchanger 120 has decreased by an amount indicative of a change in operating state of the furnace. Thus, control circuit 102 sets a FIREFLAG=1 at a step 318. In setting FIREFLAG=1, control circuit 102 is indicating that the furnace changed from the first, or pre-fire, operating state to the second, or post-fire, operating state.

In an alternative embodiment, control circuit 102 compares the speed of motor 104 to (SPEEDSAV2+$k_2$) where $k_2$ is a negative number, for example −275 rpm, and SPEEDSAV2 is the motor speed saved at a time period after combustion is sensed. If motor speed is less than (SPEEDSAV2+$k_2$), then control circuit 102 determines that the density of the combustion chamber gases flowing across heat exchanger 120 has increased by an amount indicative of a change in operating state of the furnace from the second operating state to the first operating state. In other words, control circuit 102 alternatively detects a loss of flame in combustion chamber 118 by the relatively sudden decrease in motor speed.

Referring again to flow diagram 300, control circuit 102 proceeds to a step 320 if the time in the operating state is less than m. The next steps 320, 322, 324 and 326 represent particular safety features of control circuit 102 for signaling furnace controller 128 that the flow of combustion chamber gases is outside the design limits of the furnace. In step 320, control circuit 102 compares the speed of motor 104 to a minimum speed. In a preferred embodiment, the minimum speed is determined by the speed/torque curves 202, 204, 206 and 208 of FIG. 2 depending on the particular operating state and mode (high or low stage) of the furnace. If motor speed is less than the minimum (see points 210, 214, 218 and 222 shown in FIG. 2), control circuit 102 disables the rpm output at step 322. In one preferred embodiment, control circuit 102 provides an alternating current signal having its frequency proportional to the motor speed. As disclosed in application Ser. No. 08/025,371, furnace controller 128 receives the ac signal via an interface (not shown). Thus, disabling the rpm output instructs furnace controller 128 to shut off fuel flow to combustion chamber 118 because the furnace is not in an acceptable operating pressure range.

Similarly, if the speed of motor 104 is not less than the minimum, control circuit 102 proceeds to step 324. In step 324, control circuit 102 compares the speed of motor 104 to a maximum speed. Again, the maximum speed is determined by the speed/torque curves 202, 204, 206 and 208 of FIG. 2 depending on the particular operating state and mode (high or low stage) of the furnace. If motor speed exceeds the maximum (see points 212, 216, 220 and 224 shown in FIG. 2), control circuit 102 disables the rpm output at step 326. However, if motor speed is less than the maximum and greater than the minimum, control circuit 102 proceeds to a step 328.

At step 308, control circuit 102 has already determined that motor 104 is operating within an acceptable speed range. Thus, control circuit 102 performs the 3-piece linear fit at step 328 using one of speed/torque curves stored in memory 132, such as one of curves 202, 204 or 206, 208. In other words, control circuit 102 inputs motor speed and calculates the desired current according to the appropriate speed/torque curve. At a step 330, control circuit 102 generates the motor control signal to provide the desired current to the windings of motor 104. In this manner, motor 104 will operate in accordance with one of the first speed/torque curves when the furnace is in the first operating state and in accordance with one of the second speed/torque curves when the furnace is in the second operating state. Flow diagram 300 ends at a step 332.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A draft inducer apparatus for use with a furnace that includes a combustion chamber producing combustion gases and an exhaust outlet for venting exhaust combustion gases from the furnace and that also includes at least one heat exchanger for extracting heat from exhaust combustion chamber gases and transferring heat to conditioned air, and for use with a fan for moving the combustion chamber gases through the exhaust outlet for inducing a draft in the combustion chamber that causes a pressure drop across the heat exchanger, said furnace being operable in at least two operating states wherein the density of the combustion chamber gases flowing across the heat exchanger and the fan differs from a first operating state to a second operating state, said apparatus comprising:

a motor including a shaft for driving the fan in response to a motor control signal so that different motor speeds result as a function of the density of the combustion chamber gases flowing across the fan;

a speed circuit providing a speed signal representative of the motor speed;

a circuit for defining first and second sets of speed/torque curves corresponding to a desired pressure across the heat exchanger; and a control circuit responsive to the speed signal for generating the motor control signal as a function of the first set of speed/torque curves until the speed signal indicates that the motor speed has reached a predetermined speed and for generating the motor control signal as a function of the second set of speed/torque curves after the speed signal indicates that the motor speed has reached the predetermined speed whereby the motor will operate in accordance with one or more of the first speed/torque curves when the furnace is in the first operating state and in accordance with one or more of the second speed/torque curves when the furnace is in the second operating state.

2. The apparatus of claim 1 wherein the first operating state is defined as operation of the furnace when combustion is not occurring in the combustion chamber and the second operating state is defined as operation of the furnace when combustion is occurring in the combustion chamber whereby the density of the combustion chamber gases is greater in the first operating state than in the second operating state so that the fan increases in speed when the furnace changes from the first operating state to the second operating state.

3. The apparatus of claim 1 wherein the first and second operating states each has a low stage and a high stage and wherein the furnace includes a furnace controller providing a furnace operating signal for causing the furnace to operate in either the low stage or the high stage of the first and second operating states and wherein the first and second sets of speed/torque curves defined by the defining circuit each include a speed/torque curve corresponding to the low stage and a speed/torque curve corresponding to the high stage and wherein the control circuit is responsive to the furnace operating signal for generating the motor control signal as a function of the low stage speed/torque curve of the first speed/torque curves in the low stage of the first operating state and as a function of the high stage speed/torque curve of the first speed/torque curves in the high stage of the first operating state and for generating the motor control signal as a function of the low stage speed/torque curve of the second speed/torque curves in the low stage of the second operating state and as a function of the high stage speed/torque curve of the second speed/torque curves in the high stage of the second operating state.

4. The apparatus of claim 3 wherein the control circuit is responsive to the furnace operating signal for generating the motor control signal independent of the second speed/torque curves when the furnace operating signal indicates a change from the low stage to the high stage thereby to rapidly increase the motor speed.

5. The apparatus of claim 3 wherein the control circuit is responsive to the furnace operating signal for generating the motor control signal independent of the second speed/torque curves when the furnace operating signal indicates a change from the high stage to the low stage thereby to rapidly decrease the motor speed.

6. The apparatus of claim 1 further comprising a memory for storing the motor speed as represented by the speed signal and a circuit for comparing the stored speed to the motor speed as subsequently represented by the speed signal, and wherein the control circuit detects a change from the first operating state to the second operating state when the difference between the compared speeds exceeds a predetermined amount indicating a change in the density of the combustion chamber gases.

7. The apparatus of claim 6 wherein the memory stores the motor speed a predetermined period of time after the motor begins driving the fan.

8. The apparatus of claim 6 wherein the furnace includes a fuel control providing a fuel signal representative of fuel being supplied to the combustion chamber and wherein the memory is responsive to the fuel signal for storing the motor speed when the fuel signal indicates that fuel is not being supplied to the combustion chamber and the comparing circuit is responsive to the fuel signal for comparing the stored speed to the motor speed when the fuel signal indicates that fuel is being supplied to the combustion chamber.

9. The apparatus of claim 1 further comprising a pressure switch providing a pressure signal for disabling the furnace when the pressure across the heat exchanger is less than a minimum pressure.

10. The apparatus of claim 1 wherein the circuit for defining the first and second sets of speed/torque curves includes a memory for storing a table of predefined speed/torque values corresponding to desired operation of the furnace under varying conditions.

11. The apparatus of claim 1 wherein the furnace discharges heated conditioned air to a space in response to a thermostatic control, said thermostatic control providing a thermostat signal as a function of the temperature of the air in the space, said thermostat signal having a DEMAND state for beginning operation of the furnace in the first operating state and a NO DEMAND state for ending operation of the furnace in the second operating state, and wherein the control circuit is responsive to the NO DEMAND state for generating the motor control signal whereby the motor drives the fan for a predetermined period of time after the furnace ends operation in the second operating state.

12. The apparatus of claim 11 further comprising a reset circuit responsive to the NO DEMAND state for resetting the control circuit after the furnace ends operation in the second operating state.

13. A furnace system operable in at least two operating states comprising:

a combustion chamber producing combustion gases;

an exhaust outlet for venting exhaust combustion gases from the combustion chamber;

at least one heat exchanger for extracting heat from exhaust combustion chamber gases and for transferring heat to conditioned air;

a fan for moving the combustion chamber gases through the exhaust outlet for inducing a draft in the combustion chamber that causes a pressure drop across the heat exchanger wherein the density of the combustion chamber gases flowing across the heat exchanger and the fan differs from a first operating state to a second operating state;

a motor including a shaft for driving the fan in response to a motor control signal so that different motor speeds result as a function of the density of the combustion chamber gases flowing across the fan;

a speed circuit providing a speed signal representative of the motor speed;

a circuit for defining first and second sets of speed/torque curves corresponding to a desired pressure across the heat exchanger; and a control circuit responsive to the speed signal for generating the motor control signal as a function of the first set of speed/torque curves until the speed signal indicates that the motor speed has reached a predetermined speed and for generating the motor control signal as a function of the second set of speed/torque curves after the speed signal indicates that the motor speed has reached the predetermined speed whereby the motor will operate in accordance with one or more of the first speed/torque curves when the furnace system is in the first operating state and in accordance with one or more of the second speed/torque curves when the furnace system is in the second operating state.

14. The system of claim 13 wherein the first operating state is defined as operation of the furnace system when combustion is not occurring in the combustion chamber and the second operating state is defined as operation of the furnace system when combustion is occurring in the combustion chamber whereby the density of the combustion chamber gases is greater in the first operating state than in the second operating state so that the fan increases in speed when the furnace system changes from the first operating state to the second operating state.

15. The system of claim 13 wherein the first and second operating states each has a low stage and a high stage and further comprising a furnace controller providing a furnace operating signal for causing the furnace system to operate in either the low stage or the high stage of the first and second operating states.

16. The system of claim 15 wherein the low and high stages as represented by the furnace operating signal correspond, respectively, to a first desired flow of fuel to the combustion chamber and a second desired flow of fuel to the combustion chamber greater than the first desired flow.

17. The system of claim 15 wherein the first and second sets of speed/torque curves defined by the defining circuit each include a speed/torque curve corresponding to the low stage and a speed/torque curve corresponding to the high stage and wherein the control circuit is responsive to the furnace operating signal for generating the motor control signal as a function of the low stage speed/torque curve of the first speed/torque curves in the low stage of the first operating state and as a function of the high stage speed/torque curve of the first speed/torque curves in the high stage of the first operating state and for generating the motor control signal as a function of the low stage speed/torque curve of the second speed/torque curves in the low stage of the second operating state and as a function of the high stage speed/torque curve of the second speed/torque curves in the high stage of the second operating state.

18. The system of claim 15 wherein the control circuit is responsive to the furnace operating signal for generating the motor control signal independent of the second speed/torque curves when the furnace operating signal indicates a change from the low stage to the high stage thereby to rapidly increase the motor speed.

19. The system of claim 15 wherein the control circuit is responsive to the furnace operating signal for generating the motor control signal independent of the second speed/torque curves when the furnace operating signal indicates a change from the high stage to the low stage thereby to rapidly decrease the motor speed.

20. The system of claim 13 further comprising a memory for storing the motor speed as represented by the speed signal and a circuit for comparing the stored speed to the motor speed as subsequently represented by the speed signal, and wherein the control circuit detects a change from the first operating state to the second operating state when the difference between the compared speeds exceeds a predetermined amount indicating a change in the density of the combustion chamber gases.

21. The system of claim 20 wherein the memory stores the motor speed a predetermined period of time after the motor begins driving the fan.

22. The system of claim 20 further comprising a fuel control providing a fuel signal representative of fuel being supplied to the combustion chamber and wherein the memory is responsive to the fuel signal for storing the motor speed when the fuel signal indicates that fuel is not being supplied to the combustion chamber and the comparing circuit is responsive to the fuel signal for comparing the stored speed to the motor speed when the fuel signal indicates that fuel is being supplied to the combustion chamber.

23. The system of claim 13 further comprising a pressure switch providing a pressure signal for disabling the furnace system when the pressure across the heat exchanger is less than a minimum pressure.

24. The system of claim 13 wherein the circuit for defining the first and second sets of speed/torque curves includes a memory for storing a table of predefined speed/torque values corresponding to desired operation of the furnace system under varying conditions.

25. The system of claim 13 wherein the furnace system discharges heated conditioned air to a space in response to a thermostatic control, said thermostatic control providing a thermostat signal as a function of the temperature of the air in the space, said thermostat signal having a DEMAND state for beginning operation of the furnace system in the first operating state and a NO DEMAND state for ending operation of the furnace system in the second operating state, and wherein the control circuit is responsive to the NO DEMAND state for generating the motor control signal whereby the motor drives the fan for a predetermined period of time after the furnace system ends operation in the second operating state.

26. The system of claim 25 further comprising a reset circuit responsive to the NO DEMAND state for resetting the control circuit after the furnace system ends operation in the second operating state.

27. The system of claim 15 wherein the furnace controller is responsive to the speed signal for disabling the furnace system when the speed signal indicates that the motor speed is less than a minimum speed or is greater than a maximum speed.

28. A method of operating a draft inducer apparatus for use with a furnace that includes a combustion chamber producing combustion gases and an exhaust outlet for venting exhaust combustion gases from the furnace and that also includes at least one heat exchanger for extracting heat from exhaust combustion chamber gases and transferring heat to conditioned air, and for use with a fan for moving the combustion chamber gases through the exhaust outlet for inducing a draft in the combustion chamber that causes a pressure drop across the heat exchanger, said furnace being operable in at least two operating states wherein the density of the combustion chamber gases flowing across the heat exchanger and the fan differs from a first operating state to a second operating state, said method comprising the steps of:

driving the fan with a motor in response to a motor control signal so that different motor speeds result as a function of the density of the combustion chamber gases flowing across the fan;

providing a speed signal representative of the motor speed;

defining first and second sets of speed/torque curves corresponding to a desired pressure across the heat exchanger;

generating the motor control signal in response to the speed signal as a function of the first set of speed/torque curves until the speed signal indicates that the motor speed has reached a predetermined speed; and generating the motor control signal in response to the speed signal as a function of the second set of speed/torque curves after the speed signal indicates that the motor speed has reached the predetermined speed whereby the motor will operate in accordance with one or more of the first speed/torque curves when the furnace is in the first operating state and in accordance with one or more of the second speed/torque curves when the furnace is in the second operating state.

29. The method of claim 28 further comprising the steps of defining the first operating state as operation of the furnace when combustion is not occurring in the combustion chamber and defining the second operating state as operation of the furnace when combustion is occurring in the combustion chamber whereby the density of the combustion chamber gases is greater in the first operating state than in the second operating state so that the fan increases in speed when the furnace changes from the first operating state to the second operating state.

30. The method of claim 28 wherein the first and second operating states each has a low stage and a high stage and wherein the furnace includes a furnace controller providing a furnace operating signal for causing the furnace to operate in either the low stage or the high stage of the first and second operating states and wherein the first and second sets of speed/torque curves each include a speed/torque curve corresponding to the low stage and a speed/torque curve corresponding to the high stage and further comprising the steps of generating the motor control signal in response to the furnace operating signal as a function of the low stage speed/torque curve of the first speed/torque curves in the low stage of the first operating state and as a function of the high stage speed/torque curve of the first speed/torque curves in the high stage of the first operating state and generating the motor control signal in response to the furnace operating signal as a function of the low stage speed/torque curve of the second speed/torque curves in the low stage of the second operating state and as a function of the high stage speed/torque curve of the second speed/torque curves in the high stage of the second operating state.

31. The method of claim 30 further comprising the step of generating the motor control signal in response to the furnace operating signal independent of the second speed/torque curves when the furnace operating signal indicates a change from the low stage to the high stage thereby to rapidly increase the motor speed.

32. The method of claim 30 further comprising the step of generating the motor control signal in response to the furnace operating signal independent of the second speed/torque curves when the furnace operating signal indicates a change from the high stage to the low stage thereby to rapidly decrease the motor speed.

33. The method of claim 28 further comprising the steps of storing the motor speed as represented by the speed signal and comparing the stored speed to the motor speed as subsequently represented by the speed signal whereby a change from the first operating state to the second operating state is detected when the difference between the compared speeds exceeds a predetermined amount indicating a change in the density of the combustion chamber gases.

34. The method of claim 33 wherein the step of storing the motor speed includes storing the motor speed a predetermined period of time after the motor begins driving the fan.

35. The method of claim 33 wherein the furnace includes a fuel control providing a fuel signal representative of fuel being supplied to the combustion chamber and wherein the step of storing the motor speed includes storing the motor speed when the fuel signal indicates that fuel is not being supplied to the combustion chamber and wherein the step of comparing the stored speed to the motor speed includes comparing the stored speed to the motor speed when the fuel signal indicates that fuel is being supplied to the combustion chamber.

36. The method of claim 28 further comprising the step of providing a pressure signal for disabling the furnace when the pressure across the heat exchanger is less than a minimum pressure.

37. The method of claim 28 wherein the step of defining the first and second sets of speed/torque curves includes storing in a memory a table of predefined speed/torque values corresponding to desired operation of the furnace under varying conditions.

38. The method of claim 28 wherein the furnace discharges heated conditioned air to a space in response to a thermostatic control, said thermostatic control providing a thermostat signal as a function of the temperature of the air in the space, said thermostat signal having a DEMAND state for beginning operation of the furnace in the first operating state and a NO DEMAND state for ending operation of the furnace in the second operating state, and further comprising the step of generating the motor control signal in response to the NO DEMAND state whereby the motor drives the fan for a predetermined period of time after the furnace ends operation in the second operating state.

39. A method of operating a furnace system in at least two operating states, said furnace system including a combustion chamber producing combustion gases and an exhaust outlet for venting exhaust combustion gases from the furnace system and also including at least one heat exchanger for extracting heat from exhaust combustion chamber gases and transferring heat to conditioned air and a fan for moving the combustion chamber gases through the exhaust outlet for inducing a draft in the combustion chamber that causes a pressure drop across the heat exchanger wherein the density of the combustion chamber gases flowing across the heat exchanger and the fan differs from a first operating state to a second operating state, said method comprising the steps of:

driving the fan with a motor in response to a motor control signal so that different motor speeds result as a function of the density of the combustion chamber gases flowing across the fan;

providing a speed signal representative of the motor speed;

defining first and second sets of speed/torque curves corresponding to a desired pressure across the heat exchanger;

generating the motor control signal in response to the speed signal as a function of the first set of speed/torque curves until the speed signal indicates that the motor speed has reached a predetermined speed; and generating the motor control signal in response to the speed signal as a function of the second set of speed/torque curves after the speed signal indicates that the motor speed has reached the predetermined speed whereby the motor will operate in accordance with one or more of the first speed/torque curves when the furnace system is in the first operating state and in accordance with one or more of the second speed/torque curves when the furnace system is in the second operating state.

40. The method of claim 39 further comprising the steps of defining the first operating state as operation of the furnace system when combustion is not occurring in the combustion chamber and defining the second operating state as operation of the furnace system when combustion is occurring in the combustion chamber whereby the density of the combustion chamber gases is greater in the first operating state than in the second operating state so that the fan increases in speed when the furnace system changes from the first operating state to the second operating state.

41. The method of claim 39 wherein the first and second operating states each has a low stage and a high stage and further comprising the step of providing a furnace operating signal for causing the furnace system to operate in either the low stage or the high stage of the first and second operating states.

42. The method of claim 41 wherein the first and second sets of speed/torque curves each include a speed/torque curve corresponding to the low stage and a speed/torque curve corresponding to the high stage and further comprising the steps of generating the motor control signal in response to the furnace operating signal as a function of the low stage speed/torque curve of the first speed/torque curves in the low stage of the first operating state and as a function of the high stage speed/torque curve of the first speed/torque curves in the high stage of the first operating state and generating the motor control signal in response to the furnace operating signal as a function of the low stage speed/torque curve of the second speed/torque curves in the low stage of the second operating state and as a function of the high stage speed/torque curve of the second speed/torque curves in the high stage of the second operating state.

43. The method of claim 41 further comprising the step of generating the motor control signal in response to the furnace operating signal independent of the second speed/torque curves when the furnace operating signal indicates a change from the low stage to the high stage thereby to rapidly increase the motor speed.

44. The method of claim 41 further comprising the step of generating the motor control signal in response to the furnace operating signal independent of the second speed/torque curves when the furnace operating signal indicates a change from the high stage to the low stage thereby to rapidly decrease the motor speed.

45. The method of claim 39 further comprising the steps of storing the motor speed as represented by the speed signal and comparing the stored speed to the motor speed as subsequently represented by the speed signal whereby a change from the first operating state to the second operating state is detected when the difference between the compared speeds exceeds a predetermined amount indicating a change in the density of the combustion chamber gases.

46. The method of claim 45 wherein the step of storing the motor speed includes storing the motor speed a predetermined period of time after the motor begins driving the fan.

47. The method of claim 45 further comprising the step of providing a fuel signal representative of fuel being supplied to the combustion chamber and wherein the step of storing the motor speed includes storing the motor speed when the fuel signal indicates that fuel is not being supplied to the combustion chamber and wherein the step of comparing the stored speed to the motor speed includes comparing the stored speed to the motor speed when the fuel signal indicates that fuel is being supplied to the combustion chamber.

48. The method of claim 39 further comprising the step of providing a pressure signal for disabling the furnace system when the pressure across the heat exchanger is less than a minimum pressure.

49. The method of claim 39 wherein the step of defining the first and second sets of speed/torque curves includes storing in a memory a table of predefined speed/torque values corresponding to desired operation of the furnace system under varying conditions.

50. The method of claim 39 further comprising the step of providing a thermostat signal as a function of the temperature of air in a space wherein the furnace system discharges heated conditioned air to the space in response to the thermostat signal, said thermostat signal having a DEMAND state for beginning operation of the furnace system in the first operating state and a NO DEMAND state for ending operation of the furnace system in the second operating state, and further comprising the step of generating the motor control signal in response to the NO DEMAND state whereby the motor drives the fan for a predetermined period of time after the furnace system ends operation in the second operating state.

51. The method of claim 39 further comprising the step of disabling the furnace system when the speed signal indicates that the motor speed is less than a minimum speed or is greater than a maximum speed.

52. A draft inducer system for use with a furnace that includes a combustion chamber producing combustion gases and an exhaust outlet for venting exhaust combustion gases from the furnace and that also includes at least one heat exchanger for extracting heat from exhaust combustion chamber gases and transferring heat to conditioned air, said furnace being operable in at least two operating states wherein the density of the combustion chamber gases flowing across the heat exchanger differs from a first operating state to a second operating state, said system comprising:

a fan for moving the combustion chamber gases through the exhaust outlet for inducing a draft in the combustion chamber that causes a pressure drop across the heat exchanger wherein the density of the combustion chamber gases flowing across the fan differs from the first operating state to the second operating state;

a motor including a shaft for driving the fan in response to a motor control signal so that different motor speeds result as a function of the density of the combustion chamber gases flowing across the fan;

a speed circuit providing a speed signal representative of the motor speed;

a circuit for defining first and second sets of speed/torque curves corresponding to a desired pressure across the heat exchanger; and a control circuit responsive to the speed signal for generating the motor control signal as a function of the first set of speed/torque curves until the speed signal indicates that the motor speed has reached a predetermined speed and for generating the motor control signal as a function of the second set of speed/torque curves after the speed signal indicates that the motor speed has reached the predetermined speed whereby the motor will operate in accordance with one or more of the first speed/torque curves when the furnace is in the first operating state and in accordance with one or more of the second speed/torque curves when the furnace is in the second operating state.

53. A draft inducer apparatus for use with a furnace that includes a combustion chamber producing combustion gases and an exhaust outlet for venting exhaust combustion gases from the furnace and that also includes at least one heat exchanger for extracting heat from exhaust combustion chamber gases and transferring heat to conditioned air, and for use with a fan for moving the combustion chamber gases through the combustion chamber for inducing a draft in the combustion chamber that causes a pressure drop across the heat exchanger, said furnace being operable in at least two operating states wherein the density of the combustion chamber gases flowing through the combustion chamber and across the heat exchanger differs from a first operating state to a second operating state, said apparatus comprising:

a motor including a shaft for driving the fan in response to a motor control signal so that different motor speeds result as a function of the density of the combustion chamber gases flowing through the combustion chamber;

a speed circuit providing a speed signal representative of the motor speed;

a circuit for defining first and second sets of speed/torque curves corresponding to a desired pressure across the heat exchanger; and a control circuit responsive to the speed signal for generating the motor control signal as a function of the first set of speed/torque curves until the speed signal indicates that the motor speed has reached a predetermined speed and for generating the motor control signal as a function of the second set of speed/torque curves after the speed signal indicates that the motor speed has reached the predetermined speed whereby the motor will operate in accordance with one or more of the first speed/torque curves when the furnace is in the first operating state and in accordance with one or more of the second speed/torque curves when the furnace is in the second operating state.

54. A draft inducer apparatus for use with a furnace that includes a combustion chamber producing combustion gases and an exhaust outlet for venting exhaust combustion gases from the furnace and that also includes at least one heat exchanger for extracting heat from exhaust combustion chamber gases and transferring heat to conditioned air, and for use with a fan for moving the combustion chamber gases through the exhaust outlet for inducing a draft in the combustion chamber that causes a pressure drop across the heat exchanger, said furnace being operable in at least two operating states wherein the density of the combustion chamber gases flowing across the heat exchanger and the fan differs from a first operating state to a second operating state, said apparatus comprising:

a motor including a shaft for driving the fan in response to a motor control signal so that different motor torques result as a function of the density of the combustion chamber gases flowing across the fan;

a torque circuit providing a torque signal representative of the motor torque;

a circuit for defining first and second sets of speed/torque curves corresponding to a desired pressure across the heat exchanger; and a control circuit responsive to the torque signal for generating the motor control signal as a function of the first set of speed/torque curves until the torque signal indicates that the motor speed has reached a predetermined torque and for generating the motor control signal as a function of the second set of speed/torque curves after the torque signal indicates that the motor torque has reached the predetermined torque whereby the motor will operate in accordance with one or more of the first speed/torque curves when the furnace is in the first operating state and in accordance with one or more of the second speed/torque curves when the furnace is in the second operating state.

\* \* \* \* \*